Figure 1:
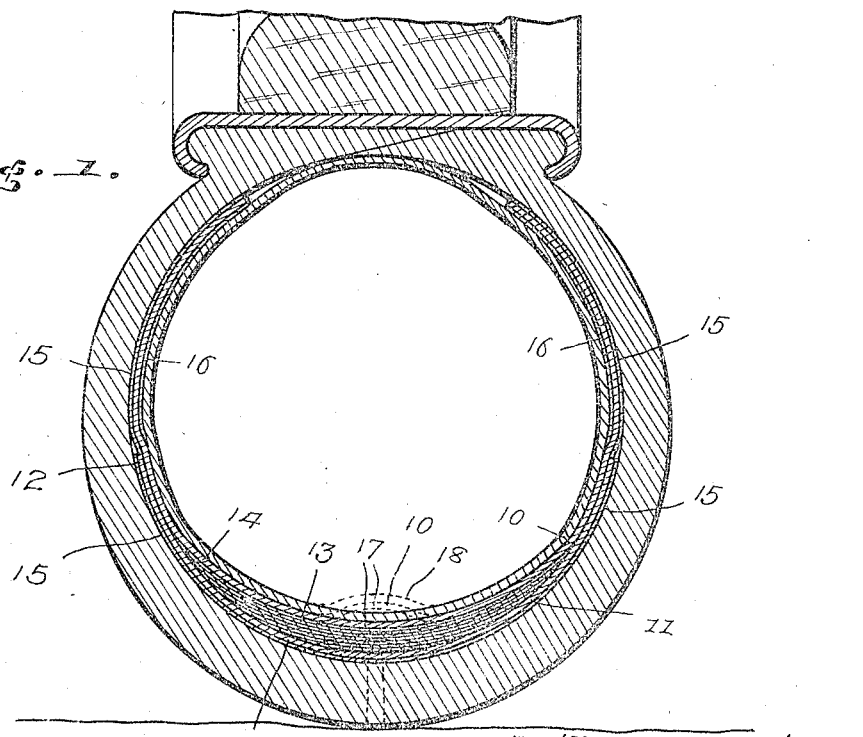

W. L. STUYVERSON.
TIRE PROTECTOR.
APPLICATION FILED JULY 9, 1918.

1,282,651.

Patented Oct. 22, 1918.

Inventor
W. L. Stuyverson
W. J. FitzGerald & Co.
Attorneys

UNITED STATES PATENT OFFICE.

WILLIAM L. STUYVERSON, OF ST. LOUIS, MICHIGAN.

TIRE-PROTECTOR.

1,282,651.  Specification of Letters Patent.  Patented Oct. 22, 1918.

Application filed July 9, 1918.  Serial No. 244,078.

*To all whom it may concern:*

Be it known that I, WILLIAM L. STUYVERSON, a citizen of the United States, residing at St. Louis, in the county of Gratiot and State of Michigan, have invented certain new and useful Improvements in Tire-Protectors; and I do hereby declare the following to be a full, clear, and exact description of the invention, such as will enable others skilled in the art to which it appertains to make and use the same.

This invention relates to a tire protector and particularly to an interlining adapted to be disposed between the inflatable tube and the shoe of a tire.

The invention has for an object to provide a novel and improved form of such protector comprising superposed layers of fabric secured together at their side edges and an interposed body of felted material disposed to extend over the tread portion of the tire tube.

A further object of the invention is to provide an improved form of tire protector comprising layers of fabric, one being of greater width than the other, and a plurality of layers of felted material interposed between said fabric, which fabric is treated to render it water-proof over its entire outer surface and over the portions of the inner face thereof at each side of the central or tread portion.

Other and further objects and advantages of the invention will be hereinafter set forth and the novel features thereof defined by the appended claim.

In the drawing,

Figure 1 is a vertical section showing the protector applied to a tire.

Figure 2:
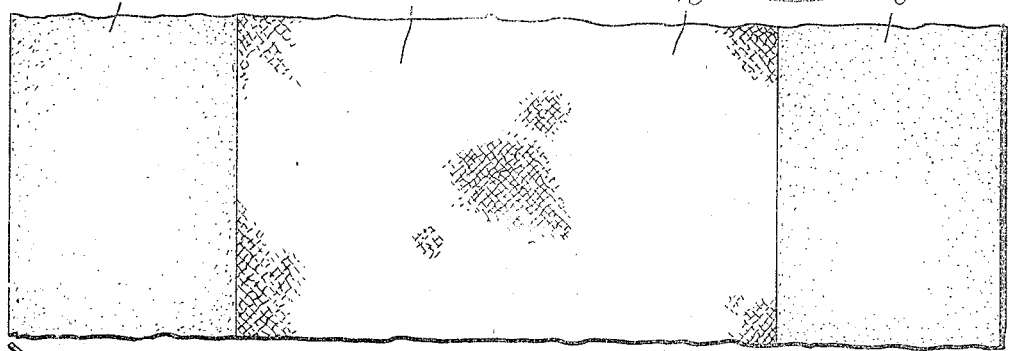
Figure 3:
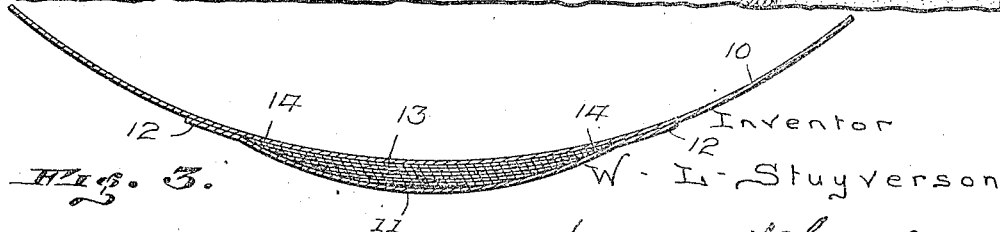

Fig. 2, a detail plan of the inner face of the protector,

Fig. 3, a detail section thereof, and

Figure 4:
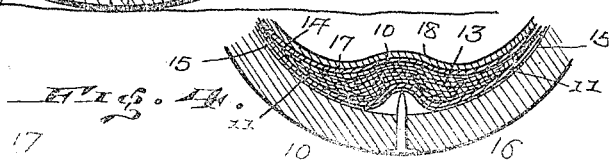

Fig. 4 is a detail section showing the action of the protector.

Like numerals refer to like parts throughout the several figures of the drawing.

The numeral 10 designates the inner layer of fabric comprising the base or foundation of the protector which is extended for sufficient length beyond the tread to partially inclose the tire tube, but may be otherwise arranged. This fabric may be of any desired character, preferably canvas cut upon the bias, so as to secure the greatest strength and flexibility thereof.

Upon the outer face of the fabric 10 a covering fabric 11 of similar character is disposed. This is of less width than the base fabric and is secured at its side edges 12 thereto in any preferred manner, for instance, by cementing.

Interposed between the fabric layers 10 and 11 is the packing material 13 which may be of any desired character, preferably felted, and as shown is arranged in layers to provide a body of greatest thickness at the center of the tread and tapering toward its side edges, as at 14. This form adapts the protector to fit snugly against the tread portion of the inflated inner tube.

For the purpose of rendering the fabric layers waterproof and imparting a body thereto, they may be treated with any desired material for that purpose, preferably with a rubber composition which is vulcanized before the assembling of the parts of the protector. This vulcanized surface, as indicated at 15 in Fig. 1, extends over the entire outer face of the protector while the inner face thereof is vulcanized only from the free end of the layer 10 inward to the edge of the layer 11, as indicated at 16 in Fig. 1, thus leaving the central portion 17 of this layer with the soft and pliable canvas surface which will readily yield and in the event of a puncture through the shoe, the resistance of the felted material causes an extended portion of the protector to yield inwardly, as indicated at 18 in Fig. 1, which prevents the entering object from encountering sufficient resistance to pass through the projector.

The application and operation of the invention will be apparent from the foregoing description and it will be seen that this invention presents a protector having a packed or felted central portion at the tread of the tire adapted to bodily yield inwardly against the inflatable tube and thus producing a puncture-proof tire, and one in which the inner tube is protected against moisture by the vulcanized surface of the protecting lining. The invention also presents a separate unit or interliner adapted for application to any ordinary tire by the user as it may be very easily and conveniently placed within the shoe and is secured and held in position by the inner tube when inflated. The material from which this protector is formed being cut on the bias allows stretching sufficient ficient to fit any size casing and when filled with rubber and vulcanized, has sufficient body to retain it in position when applied. It will also be evident that the character of fabric used and of the interposed packing may be changed as found desirable or convenient and the width of such material altered to suit conditions of use which may be present.

It will be seen from Fig. 4 that if an object such as a tack or nail passes through the outer shoe, it engages and bodily moves inward the flexible portion of the protector, thus producing a puncture-proof agent and also a means which prevents blow-outs so long as the shoe or casing is sufficient to retain the protector in position. To accomplish these results, it is essential that the felted material within the protector should be of such character and quantity as to effect a change from a point contact to a large surface contact with the inner tube and should be of such flexible character at its tread portion as to readily yield to produce such a result.

Having thus described my invention, what I claim as new is:—

A tire protector comprising superposed layers of fabric secured together at ther meeting edges, the entire outer surface there of being treated to stiffen and render it waterproof and the inner face thereof being similarly treated at each side of the tread portion which is retained in natural condition, and superposed unattached layers of freely compressible felted material disposed between said fabric layers to extend over said tread portion.

In testimony whereof I have signed my name to this specification in the presence of two subscribing witnesses.

WILLIAM L. STUYVERSON.

Witnesses:
HENRY SCHAEFFER,
MABEL K. STUYVERSON.